(12) United States Patent
Shen

(10) Patent No.: US 8,164,224 B2
(45) Date of Patent: Apr. 24, 2012

(54) VIBRATION MOTOR

(76) Inventor: Jun Shen, Phoenix, AZ (US)

( * ) Notice: Subject to any disclaimer, the term of this patent is extended or adjusted under 35 U.S.C. 154(b) by 150 days.

(21) Appl. No.: 12/685,037

(22) Filed: Jan. 11, 2010

(65) Prior Publication Data

US 2010/0176665 A1 Jul. 15, 2010

Related U.S. Application Data

(60) Provisional application No. 61/143,793, filed on Jan. 11, 2009.

(51) Int. Cl.
*H02K 33/00* (2006.01)

(52) U.S. Cl. ........................................ 310/36

(58) Field of Classification Search .................... 310/36, 310/30, 81
See application file for complete search history.

(56) References Cited

U.S. PATENT DOCUMENTS 7,148,591 B2 * 12/2006 Mizoguchi et al. ............. 310/36
2009/0039716 A1 * 2/2009 Ogawa et al. ................... 310/36
* cited by examiner

*Primary Examiner* — Nguyen N Hanh

(57) ABSTRACT

A vibration motor comprises a permanent magnet supported by a spring and an electromagnet. The electromagnet generates an alternating second magnetic field which exerts a torque on the permanent magnet and causes said permanent magnet to rotate and vibrate. The supporting spring transfers the vibration energy from the permanent magnet to the housing and ultimately to the user.

16 Claims, 6 Drawing Sheets

Front view.

Top view.

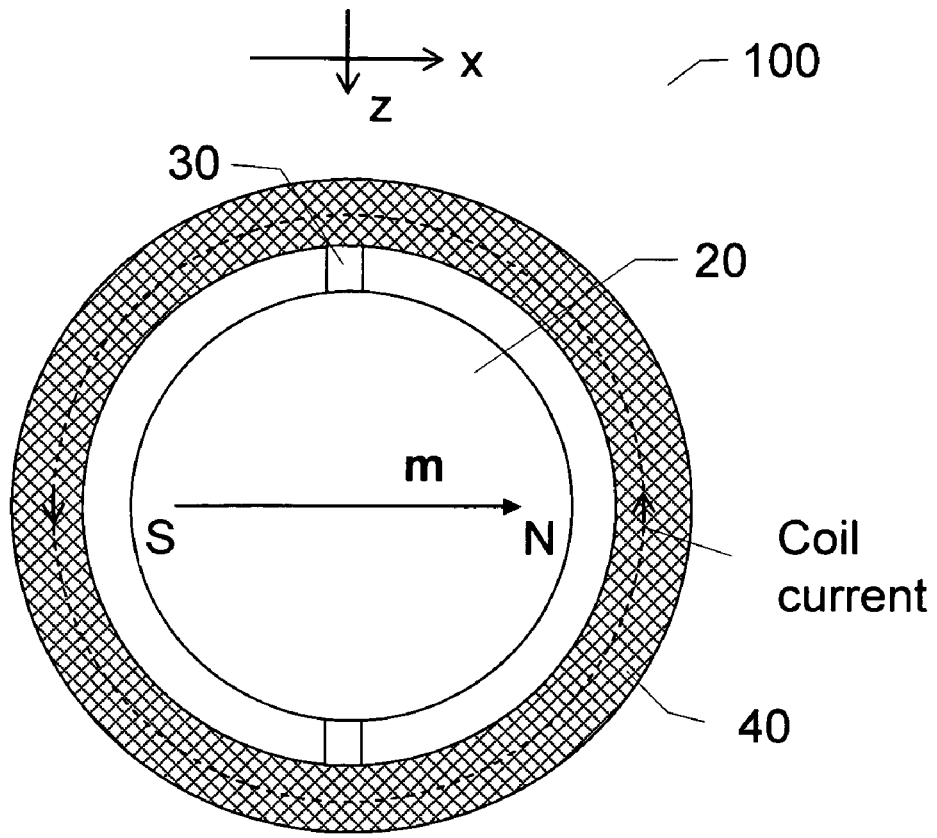
Figure 1B. Top view.
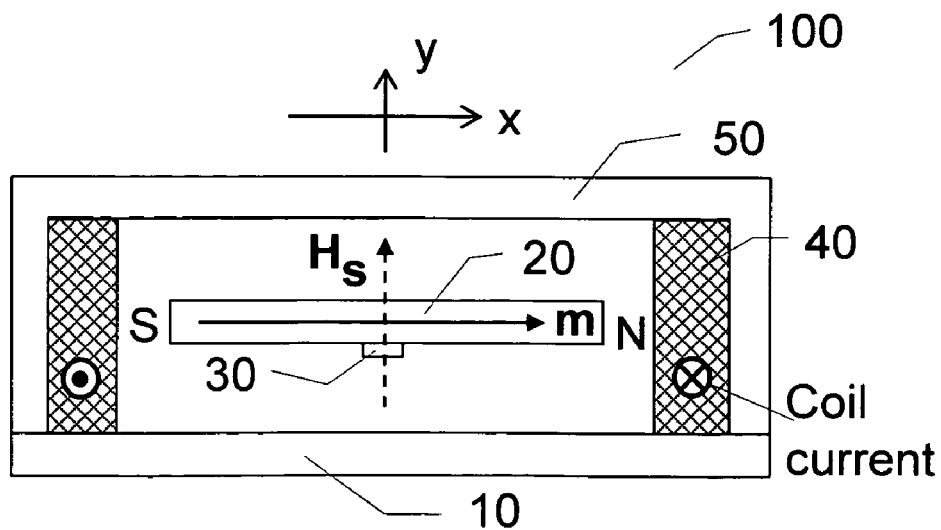
Figure 1A. Front view.

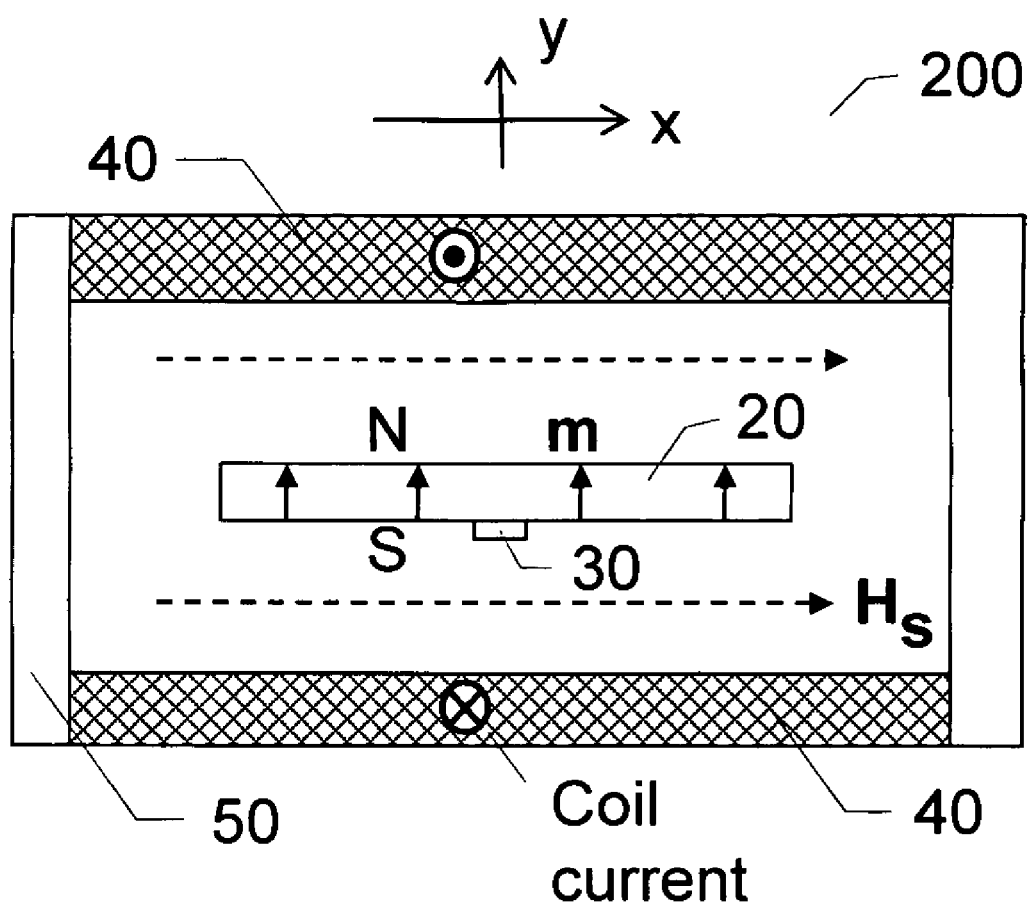
Figure 2. Front view.

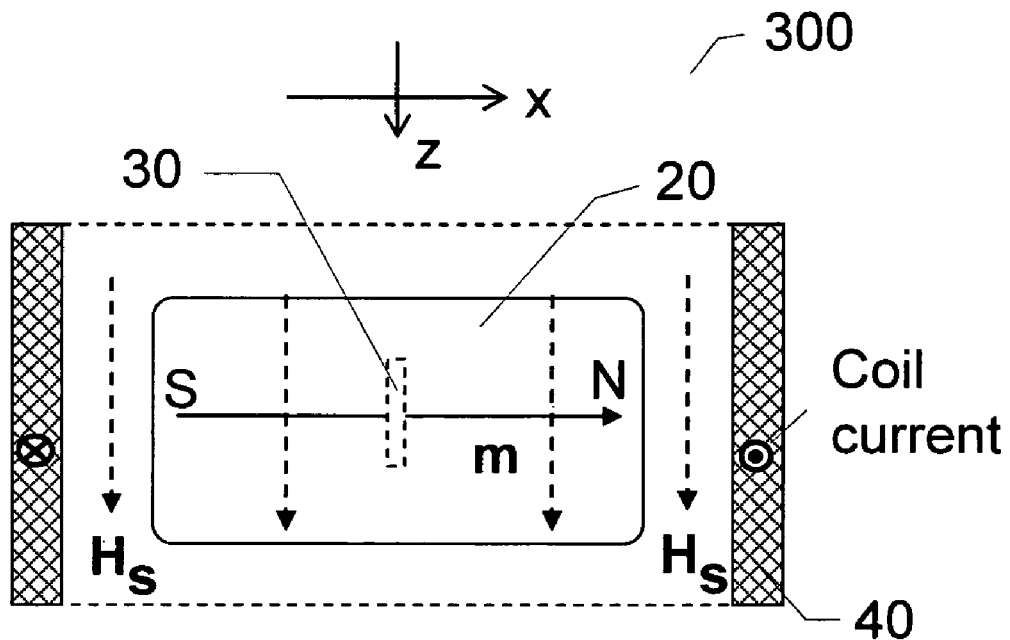
Figure 3B. Top view.
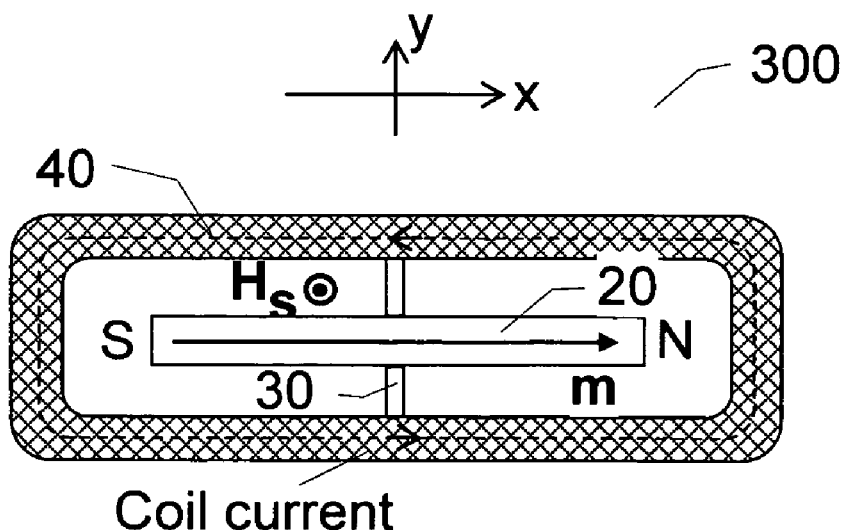
Figure 3A. Front view.

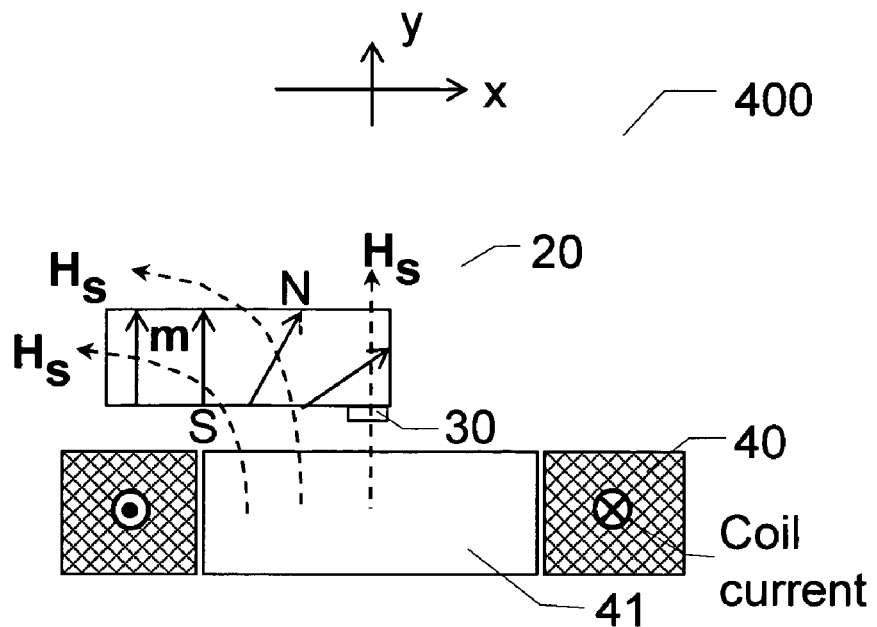
Figure 4. Front view.
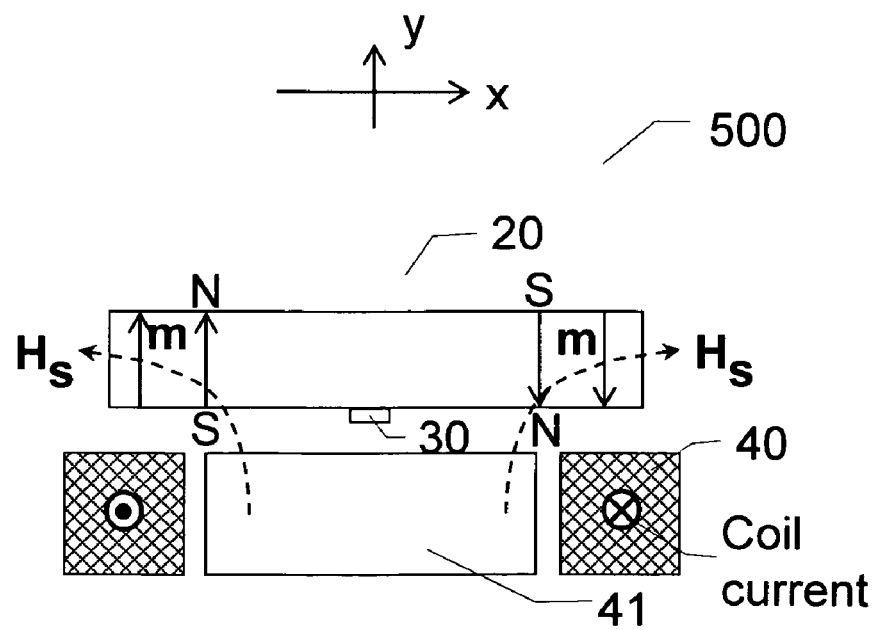
Figure 5. Front view.

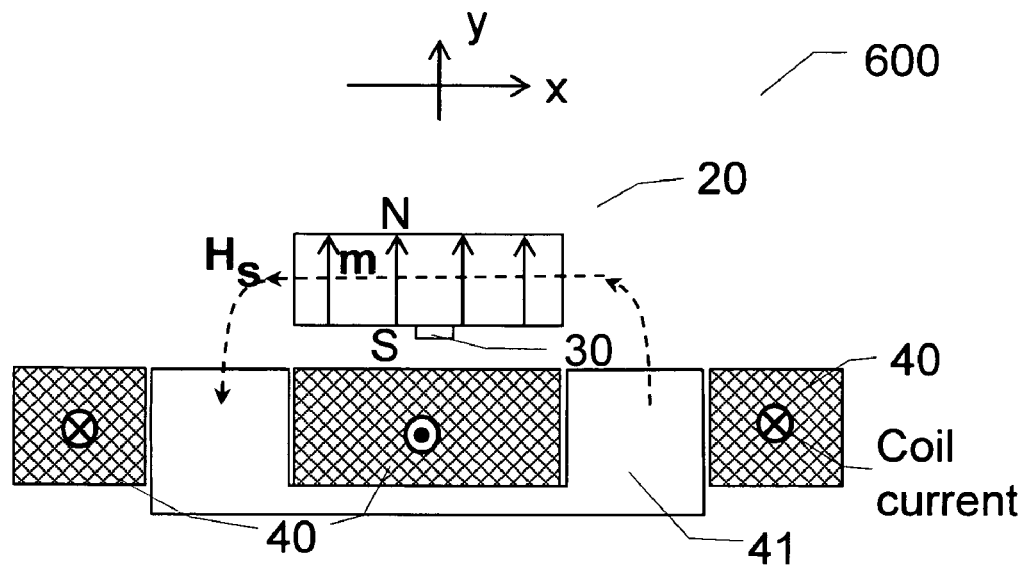
Figure 6. Front view.
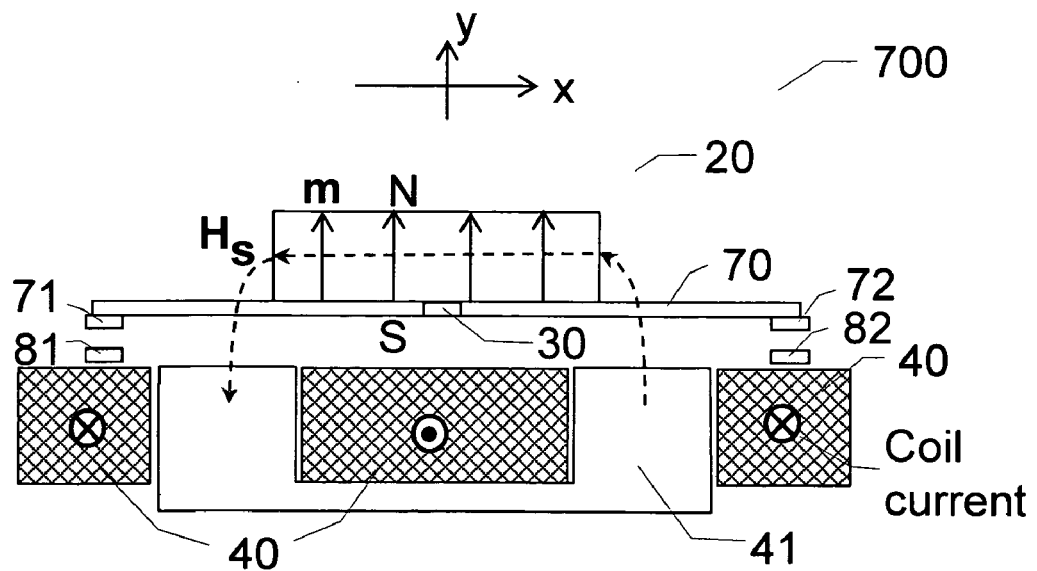
Figure 7. Front view.

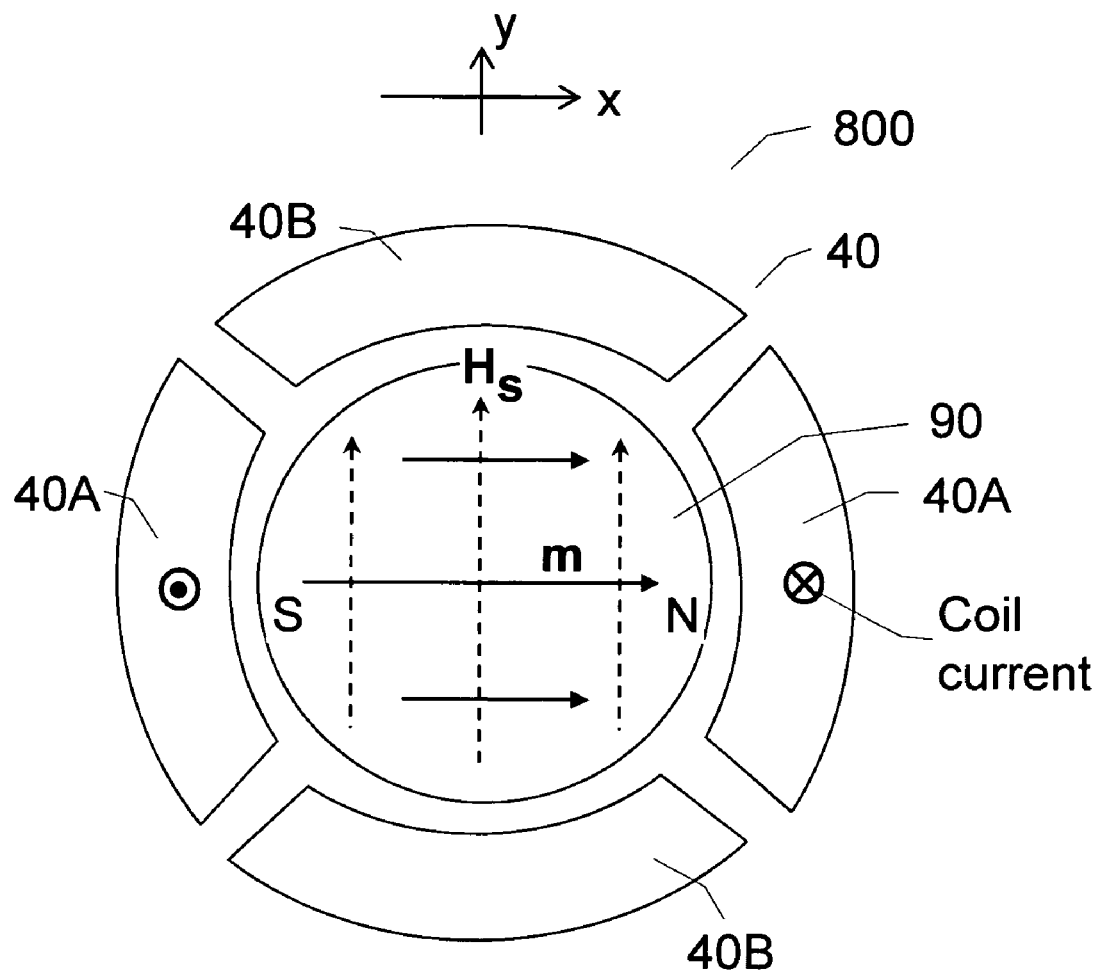
Figure 8. Top view.

VIBRATION MOTOR

This patent application claims the benefit of U.S. Provisional Patent Application Ser. No. 61/143,793, filed on Jan. 11, 2009, which is hereby incorporated by reference.

FIELD OF THE INVENTION

The present invention relates to a vibration motor comprising a movable magnet and an electromagnet.

BACKGROUND OF THE INVENTION

Vibration motors are commonly used in mobile communication devices to quietly notify a user of incoming calls without disturbing other people. A typical vibration motor uses an eccentric rotor to convert electromagnetic energy into vibration energy to generate an alert. A coil (electromagnet) produces an alternating magnetic field which interacts with the rotor and causes the rotor to rotate. Both cylindrical and planar vibration motors have been proposed and fabricated. In mobile communication devices, a planar vibration motor is more desirable because it can be made thinner. In a typical planar vibration motor, the eccentric rotor assembly in placed inside the motor. A shaft is needed to support the rotor assembly during rotation and to transfer the vibration energy to the housing of the motor, and ultimately to the user. The mechanical contact and friction between the shaft and a supporting bearing often pose reliability problems because of tear and wear. Some of the energy is wasted in the form of heat generated from the friction. Also, besides the shaft and bearing, a few more mechanical components such as an eccentric mass, brackets, etc., are needed for the operation of the device. These components make the structure more complicated and increase the manufacturing cost.

Therefore, it would be highly desirable to provide a simple, planar, highly reliable, and low power vibration motor for mobile communication devices as well as other applications.

It is a purpose of the present invention to provide a new and improved vibration motor which possesses the above desirable features.

SUMMARY OF THE INVENTION

The above problems and others are at least partially solved and the above purposes and others are realized in a vibration motor as to be described in detail below. Briefly, the vibration motor comprises a permanent magnet supported by a spring, an electromagnet, and the housing. The electromagnet generates an alternating magnetic field which exerts a torque on the permanent magnet and causes the permanent magnet to vibrate. The supporting spring transfers the vibration energy from the permanent magnet to the housing and ultimately to the user.

BRIEF DESCRIPTION OF THE FIGURES

The above and other features and advantages of the present invention are hereinafter described in the following detailed description of illustrative embodiments to be read in conjunction with the accompanying figures, wherein like reference numerals are used to identify the same or similar parts in the similar views, and:

FIGS. 1A and 1B are front and top views of an exemplary embodiment of the vibration motor;

FIG. 2 is a front view of an alternative exemplary embodiment of the vibration motor;

FIGS. 3A and 3B are front and top views of yet another exemplary embodiment of the vibration motor.

FIG. 4 is a front view of an alternative exemplary embodiment of the vibration motor;

FIG. 5 is a front view of an alternative exemplary embodiment of the vibration motor;

FIG. 6 is a front view of an alternative exemplary embodiment of the vibration motor;

FIG. 7 is a front view of an exemplary embodiment of an electromechanical relay;

FIG. 8 is a front view of an exemplary embodiment of an electrical motor;

DETAILED DESCRIPTION OF EXEMPLARY EMBODIMENTS

It should be appreciated that the particular implementations shown and described herein are examples of the invention and are not intended to otherwise limit the scope of the present invention in any way. Indeed, for the sake of brevity, conventional electronics, manufacturing, and other functional aspects of the systems (and components of the individual operating components of the systems) may not be described in detail herein. Furthermore, for purposes of brevity, the invention is frequently described herein as pertaining to a vibration motor for use in mobile communication applications. It should be appreciated that the same principle can be applied to make other types of magnetic devices (e.g., electromagnetic relays, etc.). It should also be appreciated that many other manufacturing techniques could be used to create the vibration motor described herein, and that the techniques described herein could be used in optical systems, fluidic control systems, acoustical systems, optical and electrical switching systems, or any other systems. For example, a display projector or an optical switch can be produced by forming a mirror surface on the magnet and other optical light engines and electronic circuits. Further, the techniques would be suitable for application in optical systems, electrical systems, consumer electronics, industrial electronics, wireless systems, space applications, fluidic control systems, medical systems, or any other application. Moreover, it should be understood that the spatial descriptions made herein are for purposes of illustration only, and that practical vibration motors may be spatially arranged in any orientation or manner. Arrays of these systems can also be formed by connecting them in appropriate ways and with appropriate devices.

FIG. 1 shows an exemplary embodiment of a vibration motor. With reference to FIG. 1, a vibration motor 100 suitably comprises a substrate 10, a permanent magnet 20 supported by a spring 30, an electromagnet 40, and a housing 50.

Substrate 10 can be any material (plastics, metal, ceramic, etc.) which provides a support to the vibration motor.

Permanent magnet 20 is preferably magnetized permanently (with a magnetic moment m) along horizontal direction (along x-axis) and produces a first magnetic field. As an example, magnet 20 is a thin disk-shaped NdFeB permanent magnet with an approximate remnant magnetization ($B_r=\mu_0 M$) of about 1 T through a diameter (predominantly along x-axis), with the North Pole (N) on the right end and the South Pole (S) on the left. Other possible hard magnetic materials are, for example, SmCo, AlNiCo, Ceramic magnets (made of Barium and Strontium Ferrite), CoPtP alloy, injection-molded or compression-bonded magnets, and others, that can maintain a remnant magnetization ($B_r=\mu_0 M$) from about 0.001 T (10 Gauss) to above 1 T ($10^4$ Gauss), with coercivity (Hc) from about $7.96 \times 10^2$ A/m (10 Oe) to above $7.96 \times 10^5$ A/m ($10^4$ Oe).

Spring 30 provides a support to permanent magnet 20 so that said permanent magnet 20 can rotate or vibrate upon external actuation.

Electromagnet 40 is a coil formed by winding electrically conducting metal wires around permanent magnet 20. The metal wires can be any electrically conducting material such as copper, aluminum, gold, etc. When current passes said coil 40, it produces a second perpendicular (y-axis) magnetic field ($H_s$) so that a magnetic torque ($\tau_s=\mu_0 m \times H_s$) about z-axis (coming out from the paper in FIG. 1A) can be created on permanent magnet 20. The direction (pointing up or down) of the second magnetic field ($H_s$) depends on the direction of the coil current, which in turn determines the direction (clockwise or counterclockwise about z-axis) of the torque ($\tau_s=\mu_0 m \mu H_s$) on permanent magnet 20. The magnitude of the torque can be adjusted by the amount of current passing through the coil. Alternating the direction of the coil current can change the torque on permanent magnet 20 and cause permanent magnet 20 to rotate and vibrate about z-axis.

Cover 50 provides a protection to the vibration motor.

Other additional layers, magnetic shielding layers, etc., can be added for various purposes, but are omitted here for the purpose of brevity.

In a broad aspect of the invention and with reference to FIG. 1, vibration motor 100 comprises a permanent magnet 20 supported by a spring 30, an electromagnet 40, and substrate 10 and housing 50. Electromagnet 40 generates an alternating second magnetic field ($H_s$) which exerts a torque ($\tau_s=\mu_0 m \times H_s$) on permanent magnet 20 and causes said permanent magnet 20 to rotate and vibrate. Supporting spring 30 transfers the vibration energy from permanent magnet 20 to housing 50 and substrate 10 and ultimately to the user.

Electronic driving circuits (not shown) are connected to electromagnet 40 to control the direction (polarity), amplitude, frequency, pulse patterns, and other parameters of the coil current to adjust the vibration patterns of said permanent magnet 20.

FIG. 2 discloses an alternative exemplary embodiment of the vibration motor. In this embodiment (FIG. 2), a vibration motor 200 suitably comprises a permanent magnet 20 supported by a spring 30, an electromagnet 40, and a housing 50.

In this exemplary embodiment, permanent magnet 20 is preferably magnetized permanently (with a magnetic moment m) along vertical direction (along y-axis) and produces a first magnetic field.

Spring 30 provides a support to permanent magnet 20 so that said permanent magnet 20 can rotate or vibrate upon external actuation.

Electromagnet 40 is a coil formed by winding electrically conducting metal wires around permanent magnet 20. The metal wires can be any electrically conducting material such as copper, aluminum, gold, etc. When current passes said coil 40, it produces a second horizontal (x-axis) magnetic field ($H_s$) so that a magnetic torque ($\tau_s=\mu_0 m \times H_s$) about z-axis (coming out from the paper in FIG. 2) can be created on permanent magnet 20. The direction (pointing right or left) of the second magnetic field ($H_s$) depends on the direction of the coil current, which in turn determines the direction (clockwise or counterclockwise about z-axis) of the torque ($\tau_s=\mu_0 m \times H_s$) on permanent magnet 20. The magnitude of the torque can be adjusted by the amount of current passing through the coil. Alternating the direction of the coil current can change the torque on permanent magnet 20 and cause permanent magnet 20 to rotate and vibrate about z-axis.

Cover 50 provides a protection to the vibration motor.

Other additional layers, substrates, magnetic shielding layers, etc., can be added for various purposes, but are omitted here for the purpose of brevity.

With reference to FIG. 2, vibration motor 200 comprises a permanent magnet 20 supported by a spring 30, an electromagnet 40, and a substrate 10 and a housing 50. Electromagnet 40 generates an alternating second magnetic field ($H_s$) which exerts a torque ($\tau_s=\mu_0 m \times H_s$) on permanent magnet 20 and causes said permanent magnet 20 to rotate and vibrate. Supporting spring 30 transfers the vibration energy from permanent magnet 20 to housing 50 and ultimately to the user.

FIGS. 3A and 3B disclose yet another exemplary embodiment of the vibration motor. In this embodiment (FIGS. 3A and 3B), a vibration motor 300 suitably comprises a permanent magnet 20 supported by a spring 30, and an electromagnet 40.

In this exemplary embodiment, permanent magnet 20 is preferably magnetized permanently (with a magnetic moment m) along horizontal direction (along x-axis) and produces a first magnetic field.

Spring 30 provides a support to permanent magnet 20 so that said permanent magnet 20 can rotate or vibrate upon external actuation.

Electromagnet 40 is a coil formed by winding electrically conducting metal wires around permanent magnet 20. The metal wires can be any electrically conducting material such as copper, aluminum, gold, etc. When current passes the coil, it produces a second (along z-axis, coming out from the paper in FIG. 3A, and pointing downward in FIG. 3B) magnetic field ($H_s$) so that a magnetic torque ($\tau_s=\mu_0 m \times H_s$) about y-axis (coming out from the paper in FIG. 3B and pointing upward in FIG. 3A) can be created on permanent magnet 20. The direction (positive or negative along z-axis) of the second magnetic field ($H_s$) depends on the direction of the coil current, which in turn determines the direction (clockwise or counterclockwise about y-axis) of the torque ($\tau_s=\mu_0 m \times H_s$) on permanent magnet 20. The magnitude of the torque can be adjusted by the amount of current passing through the coil. Alternating the direction of the coil current can change the torque on permanent magnet 20 and cause permanent magnet 20 to rotate and vibrate about y-axis.

Other additional layers, substrates, housing, magnetic shielding layers, etc., can be added for various purposes, but are omitted here for the purpose of brevity.

With reference to FIGS. 3A and 3B, vibration motor 300 comprises a permanent magnet 20 supported by a spring 30, and an electromagnet 40. Electromagnet 40 generates an alternating second magnetic field ($H_s$) which exerts a torque ($\tau_s=\mu_0 m \times H_s$) on permanent magnet 20 and causes said permanent magnet 20 to rotate and vibrate about y-axis. Supporting spring 30 transfers the vibration energy from permanent magnet 20 to housing 50 and ultimately to the user.

FIG. 4 discloses yet another exemplary embodiment of the vibration motor. In this embodiment (FIG. 4), a vibration motor 400 suitably comprises a permanent magnet 20 supported by a spring 30, and an electromagnet 40.

In this exemplary embodiment, permanent magnet 20 is preferably magnetized permanently with a varying magnetization distribution (pointing upward near the left edge and pointing right near the right edge) as shown in FIG. 4 and produces a first magnetic field. The right edge of permanent magnet is near the center of electromagnet 40.

Spring 30 provides a support to permanent magnet 20 so that said permanent magnet 20 can rotate or vibrate upon external actuation.

Electromagnet 40 is a coil formed by winding electrically conducting metal wires around an optional soft magnetic core 41. The metal wires can be any electrically conducting material such as copper, aluminum, gold, etc. When current passes the coil, it produces a second magnetic field ($H_s$) which is mostly vertical near the center of the coil and diverges (pointing horizontally) near the edge of the coil. This second magnetic field ($H_s$) is predominantly perpendicular to the magnetization direction of permanent magnet 20 everywhere inside permanent magnet 20 so that a magnetic torque ($\tau_s$=volume integral of all vector cross-product of the magnetic moment in permanent magnet 20 and $H_s$) about z-axis (coming out from the paper in FIG. 4) can be created on permanent magnet 20. The direction of the second magnetic field ($H_s$) depends on the direction of the coil current, which in turn determines the direction (clockwise or counterclockwise about z-axis) of the torque ($\tau_s$) on permanent magnet 20. The magnitude of the torque can be adjusted by the amount of current passing through the coil. Alternating the direction of the coil current can change the torque on permanent magnet 20 and cause permanent magnet 20 to rotate or vibrate about z-axis.

Other additional layers, substrates, housing, magnetic shielding layers, etc., can be added for various purposes, but are omitted here for the purpose of brevity.

With reference to FIG. 4, vibration motor 400 comprises a permanent magnet 20 supported by a spring 30, and an electromagnet 40 (with an optional soft magnetic core 41). Electromagnet 40 generates an alternating second magnetic field ($H_s$) which exerts a torque ($\tau_s$) on permanent magnet 20 and causes said permanent magnet 20 to rotate and vibrate about z-axis. Supporting spring 30 transfers the vibration energy from permanent magnet 20 to a housing and ultimately to the user.

FIG. 5 discloses yet another exemplary embodiment of the vibration motor. In this embodiment (FIG. 5), a vibration motor 500 suitably comprises a permanent magnet 20 supported by a spring 30, and an electromagnet 40.

In this exemplary embodiment, permanent magnet 20 is preferably magnetized permanently with a varying magnetization distribution (pointing upward near the left edge and pointing downward near the right edge) as shown in FIG. 5 and produces a first magnetic field.

Spring 30 provides a support to permanent magnet 20 so that said permanent magnet 20 can rotate or vibrate upon external actuation.

Electromagnet 40 is a coil formed by winding electrically conducting metal wires around an optional soft magnetic core 41. The metal wires can be any electrically conducting material such as copper, aluminum, gold, etc. When current passes the coil, it produces a second magnetic field ($H_s$) which is mostly vertical near the center of the coil and diverges (pointing horizontally) near the edge of the coil. This second magnetic field ($H_s$) is predominantly perpendicular to the magnetization direction of permanent magnet 20 near the edge of permanent magnet 20 so that a magnetic torque ($\tau_s$=volume integral of all vector cross-product of the magnetic moment in permanent magnet 20 and $H_s$) about z-axis (coming out from the paper in FIG. 5) can be created on permanent magnet 20. The direction of the second magnetic field ($H_s$) depends on the direction of the coil current, which in turn determines the direction (clockwise or counterclockwise about z-axis) of the torque ($\tau_s$) on permanent magnet 20. The magnitude of the torque can be adjusted by the amount of current passing through the coil. Alternating the direction of the coil current can change the torque on permanent magnet 20 and cause permanent magnet 20 to rotate or vibrate about z-axis.

Other additional layers, substrates, housing, magnetic shielding layers, etc., can be added for various purposes, but are omitted here for the purpose of brevity.

With reference to FIG. 5, vibration motor 500 comprises a permanent magnet 20 supported by a spring 30, and an electromagnet 40 (with an optional soft magnetic core 41). Electromagnet 40 generates an alternating second magnetic field ($H_s$) which exerts a torque ($\tau_s$) on permanent magnet 20 and causes said permanent magnet 20 to rotate and vibrate about z-axis. Supporting spring 30 transfers the vibration energy from permanent magnet 20 to a housing and ultimately to the user.

FIG. 6 discloses yet another exemplary embodiment of the vibration motor. In this embodiment (FIG. 6), a vibration motor 600 suitably comprises a permanent magnet 20 supported by a spring 30, and an electromagnet 40.

In this exemplary embodiment, permanent magnet 20 is preferably magnetized permanently (with a magnetic moment m) along vertical direction (along y-axis) as shown in FIG. 6 and produces a first magnetic field.

Spring 30 provides a support to permanent magnet 20 so that said permanent magnet 20 can rotate or vibrate upon external actuation.

Electromagnet 40 is a coil formed by winding electrically conducting metal wires around an optional soft magnetic core 41. The metal wires can be any electrically conducting material such as copper, aluminum, gold, etc. When current passes the coil, it produces a second magnetic field ($H_s$) which is predominantly horizontal in permanent magnet 20. This second magnetic field ($H_s$) is predominantly perpendicular to the magnetization direction of permanent magnet 20 so that a magnetic torque ($\tau_s$=volume integral of all vector cross-product of the magnetic moment in permanent magnet 20 and $H_s$) about z-axis (coming out from the paper in FIG. 6) can be created on permanent magnet 20. The direction of the second magnetic field ($H_s$) depends on the direction of the coil current, which in turn determines the direction (clockwise or counterclockwise about z-axis) of the torque ($\tau_s$) on permanent magnet 20. The magnitude of the torque can be adjusted by the amount of current passing through the coil. Alternating the direction of the coil current can change the torque on permanent magnet 20 and cause permanent magnet 20 to rotate or vibrate about z-axis.

Other additional layers, substrates, housing, magnetic shielding layers, etc., can be added for various purposes, but are omitted here for the purpose of brevity.

With reference to FIG. 6, vibration motor 600 comprises a permanent magnet 20 supported by a spring 30, and an electromagnet 40 (with an optional soft magnetic core 41). Electromagnet 40 generates an alternating second magnetic field ($H_s$) which exerts a torque ($\tau_s$) on permanent magnet 20 and causes said permanent magnet 20 to rotate and vibrate about z-axis. Supporting spring 30 transfers the vibration energy from permanent magnet 20 to a housing and ultimately to the user.

FIG. 7 discloses an exemplary embodiment of an electromechanical relay. In this embodiment (FIG. 7), an electromechanical relay suitably comprises a permanent magnet 20 supported by a spring 30 and affixed to a cantilever 70, an electromagnet 40, and bottom electrical contacts 81 and 82.

In this exemplary embodiment, permanent magnet 20 is preferably magnetized permanently (with a magnetic moment m) along vertical direction (along y-axis) as shown in FIG. 7 and produces a first magnetic field.

Spring 30 provides a support to permanent magnet 20 so that said permanent magnet 20 can rotate or vibrate upon external actuation. Cantilever 70 has at least one end with electrical contacts (two ends are shown in FIG. 7: left end with top electrical contact 71 and right end with top electrical contact 72) and rotates with permanent magnet 20. Top electrical contacts 71, 72, and bottom electrical contacts 81 and 82 can be made of any electrically contacting material such as gold, silver, tungsten, Rhodium, etc., and metal alloys.

Electromagnet 40 is a coil formed by winding electrically conducting metal wires around an optional soft magnetic core 41. The metal wires can be any electrically conducting material such as copper, aluminum, gold, etc. When current passes the coil, it produces a second magnetic field ($H_s$) which is predominantly horizontal in permanent magnet 20. This second magnetic field ($H_s$) is predominantly perpendicular to the magnetization direction of permanent magnet 20 so that a magnetic torque ($\tau_s$=volume integral of all vector cross-product of the magnetic moment in permanent magnet 20 and $H_s$) about z-axis (coming out from the paper in FIG. 6) can be created on permanent magnet 20. The direction of the second magnetic field ($H_s$) depends on the direction of the coil current, which in turn determines the direction (clockwise or counterclockwise about z-axis) of the torque ($\tau_s$) on permanent magnet 20. The magnitude of the torque can be adjusted by the amount of current passing through the coil. When permanent magnet 20 rotates, it causes cantilever 70 to rotate with it and one of the top electrical contacts to touch one of the corresponding bottom electrical contacts, forming a closed electrical circuit. As shown in FIG. 7, the coil-induced second magnetic field $H_s$ points toward left and generates a counterclockwise torque (about z-axis) on permanent magnet 20, causes permanent magnet 20 and cantilever 70 to rotate counterclockwise and top electrical contact 71 to touch bottom electrical contact 81, forming a closed electrical circuit on the left side. To open the electrical circuit on the left side, one can apply an electrical current to the coil 40 in the direction opposite to those indicated in FIG. 7, reversing the direction of the torque on permanent magnet 20 and causing permanent magnet 20 and cantilever 70 to rotate clockwise, which in turn opens the electrical contacts on the left and closes the electrical contacts on the right. Soft magnetic core 41 enhances the magnetic flux concentration generated by the coil and also can be placed suitably to attract and hold permanent magnet 20 in a stable position. Alternatively, other soft magnetic layers can be placed at the bottom or top to hold permanent magnet 20 in a stable position for latching relays.

Other additional layers, substrates, housing, magnetic shielding layers, etc., can be added for various purposes, but are omitted here for the purpose of brevity. Apparently, cantilever 70, top electrical contacts 71 and 72, and bottom electrical contacts 81 and 82 can be suitably applied to other aforementioned vibration motors (FIGS. 1 to 6) to form an electromechanical relay.

FIG. 8 discloses an exemplary embodiment of an electrical motor. In this embodiment (FIG. 8), an electrical motor suitably comprises a rotor 90, a stator 40, and other bearing, housing, brushes and terminals (not shown).

In this exemplary embodiment, rotor 90 has a rotational axis at the center of the rotor and comprises a permanent magnet which is preferably magnetized permanently (with a magnetic moment m) perpendicular to the rotational axis as shown in FIG. 7 and produces a first magnetic field. Stator 40 comprises two sets of coils (coil 40A and 40B). When current flows in coil 40A in the directions shown in FIG. 8 (into the paper on the right and out from the paper on the left), it produces a second magnetic field $H_s$ (dashed lines with arrows) which is predominantly along the positive y-axis, and exerts a counterclockwise torque ($\tau_s = \mu_0 m \times H_s$) on rotor 90 and causes rotor 90 to rotate counterclockwise. When rotor 90 rotates to a position where its magnetic moment predominantly points upward (along positive y-axis), coil 40A can be de-energized and coil 40B is energized with current flowing into the paper in the top panel and out of the paper in the lower panel so that it generates a second magnetic field $H_s$ which is predominantly along the negative x-axis, and exerts a counterclockwise torque on rotor 90 and continues to cause rotor 90 to rotate counterclockwise. By alternatively energizing coils 40A and 40B and alternatively changing the current polarities, the rotation of rotor 90 can be sustained.

It will be understood that many other embodiments and combinations of different choices of materials and arrangements could be formulated without departing from the scope of the invention. Similarly, various topographies and geometries of the vibration motor could be formulated by varying the layout of the various components.

The corresponding structures, materials, acts and equivalents of all elements in the claims below are intended to include any structure, material or acts for performing the functions in combination with other claimed elements as specifically claimed. Moreover, the steps recited in any method claims may be executed in any order. The scope of the invention should be determined by the appended claims and their legal equivalents, rather than by the examples given above.

REFERENCE

[1] U.S. Pat. No. 6,828,705B1.
[2] U.S. Pat. No. 6,323,757 B1.
[3] U.S. Pat. No. 6,836,039 B2.
[4] U.S. Pat. No. 6,636,007 B2.
[4] U.S. Pat. No. 6,573,627 B2.
[5] U.S. Pat. No. 7,482,899 B2.
[6] U.S. Pat. No. 7,642,885.
[7] U.S. Pat. No. 5,818,316.
[8] U.S. Pat. No. 6,469,602 B2.
[9] U.S. Pat. No. 6,124,650.
[10] U.S. Pat. No. 6,469,603 B1.
[11] U.S. Pat. No. 5,398,011.
[12] U.S. Pat. No. 5,847,631.
[13] U.S. Pat. No. 6,094,116.
[14] U.S. Pat. No. 6,084,281.
[15] U.S. Pat. No. 5,475,353.
[16] U.S. Pat. No. 5,703,550.
[17] U.S. Pat. No. 5,945,898.
[18] U.S. Pat. No. 6,143,997.
[19] U.S. Pat. No. 6,794,965 B2.

What is claimed is:

1. A magnetic device, comprising:
   a substrate;
   a movable body attached to said substrate having a rotational axis, said movable body comprising a first permanent magnet having a first magnetic field and a permanent magnetization;
   a switching element having a coil which can be energized or de-energized, wherein said coil is energized by rising a current through said generating a switching magnetic field which has a main component primarily perpendicular to said permanent magnetization in the region where said switching magnetic field goes through said first permanent magnet, and as a result of the volume integral of the vector-cross product of said switching magnetic field and said permanent magnetization, producing a torque on said first permanent magnet and causing said movable body to rotate about said rotational axis;
   wherein the rotation direction of said movable body is alternated by changing the polarity of said coil;
   wherein a cover is provided to protect said magnetic device.

2. A magnetic device according to claim 1, wherein said movable body is attached to said substrate by a flexure spring.

3. A magnetic device according to claim 1, wherein the mechanical energy generated by changing the rotation direction of said movable body is transferred to the housing of said magnetic device and consequently to the end user carrying said magnetic device.

4. A magnetic device according to claim 1, wherein said switching element further comprises a soft magnetic core.

5. A magnetic device according to claim 1, wherein said cover comprises soft magnetic material.

6. A magnetic device according to claim 1, wherein said movable body further comprises an eccentric mass.

7. A magnetic device, comprising:
   a substrate;
   a movable body attached to said substrate having a rotational axis, said movable body comprising a first permanent magnet having a first magnetic field and a permanent magnetization;
   a switching element having a coil which can be energized or de-energized, wherein said coil is energized by passing a current through said coil for generating a switching magnetic field which has a main component primarily perpendicular to said permanent magnetization in the region where said switching magnetic field goes through said first permanent magnet, and as a result of the volume integral of the vector-cross product of said switching magnetic field and said permanent magnetization, producing a torque on said first permanent magnet and causing said movable body to rotate about said rotational axis;
   wherein the rotation direction of said movable body is alternated by changing the polarity of said coil;
   wherein said movable body comprising at least movable electrical contact and said substrate further comprising at least a stationary electrical contact, wherein the rotation of said movable body causes said movable electrical contact either to touch said stationary electrical contact or to move away from said stationary electrical contact.

8. A magnetic device according to claim 7, wherein said switching element further comprises a soft magnetic core.

9. A magnetic device according to claim 7, wherein said movable body is attached to said substrate by a flexure spring.

10. A magnetic device according to claim 7, wherein the mechanical energy generated by changing the rotation direction of said movable body is transferred to the housing of said magnetic device and consequently to the end user carrying said magnetic device.

11. A magnetic device according to claim 7, wherein said movable body further comprises an eccentric mass.

12. A magnetic device, comprising:
   a substrate;
   a movable body attached to said substrate having a rotational axis, said movable body comprising a first permanent magnet having a first magnetic field and a permanent magnetization;
   a switching element having a coil which can be energized or de-energized, wherein said coil is energized by passing a current through said coil for generating switching magnetic field which has a main component primarily perpendicular to said permanent magnetization in the region where said switching magnetic field goes through said first permanent magnet, and as a result of the volume integral of the vector-cross product of said switching magnetic field and said permanent magnetization, producing a torque on said first permanent magnet and causing said movable body to rotate about said rotational axis;
   wherein the rotation direction of said movable body is alternated by changing the polarity of said coil;
   wherein said switching element further comprising at least a second coil, wherein said coil and said second coil are energized alternatively in a synchronized way such that the torque on said movable body causes said movable body to rotate continuously in one direction.

13. A magnetic device according to claim 12, wherein said movable body further comprises an eccentric mass.

14. A magnetic device according to claim 12, wherein said switching element further comprises a soft magnetic core.

15. A magnetic device according to claim 12, wherein said movable body is attached to said substrate by a flexure spring.

16. A magnetic device according to claim 12, wherein the mechanical energy generated by changing the rotation direction of said movable body is transferred to the housing of said magnetic device and consequently to the end user carrying said magnetic device.

* * * * *